March 26, 1968  E. M. KIMURA  3,374,760

TORPEDO ROLL CONTROL SYSTEM

Filed May 4, 1966

*INVENTOR.*
EDWARD M. KIMURA
BY
MICHAEL F. OGLO
ROY MILLER
ATTORNEYS.

3,374,760
TORPEDO ROLL CONTROL SYSTEM
Edward M. Kimura, Pasadena, Calif., assignor to the
United States of America as represented by the Secretary of the Navy
Filed May 4, 1966, Ser. No. 548,820
2 Claims. (Cl. 114—20)

This invention relates to improvements in roll control systems for torpedoes, and more particularly to a roll control system responsive to "on-off" signals.

There are two known prior art approaches to obtaining roll control. One is to employ a separate set of control surfaces, and to differentially drive these surfaces. Prior to the present invention this was the only method which could be made responsive to the simpler on-off type control systems, but it involves the mechanical complexity, and the added hydrodynamic drag of the additional set of surfaces. The other approach has been to employ selective differential rudder splay to provide roll control, but prior to the present invention this could only be done by employing complex proportional control techniques, requiring control surface position feedback sensors and linear amplifiers.

An object of the invention is to provide a roll control system which is responsive to an on-off signal, and which enables the dual utilization of the torpedo's azimuth control surfaces for roll control.

Another objective is to provide a simplified torpedo roll control system of the type employing differential rudder splay to provide roll control response which can be operated by on-off control signals.

Figure 1:
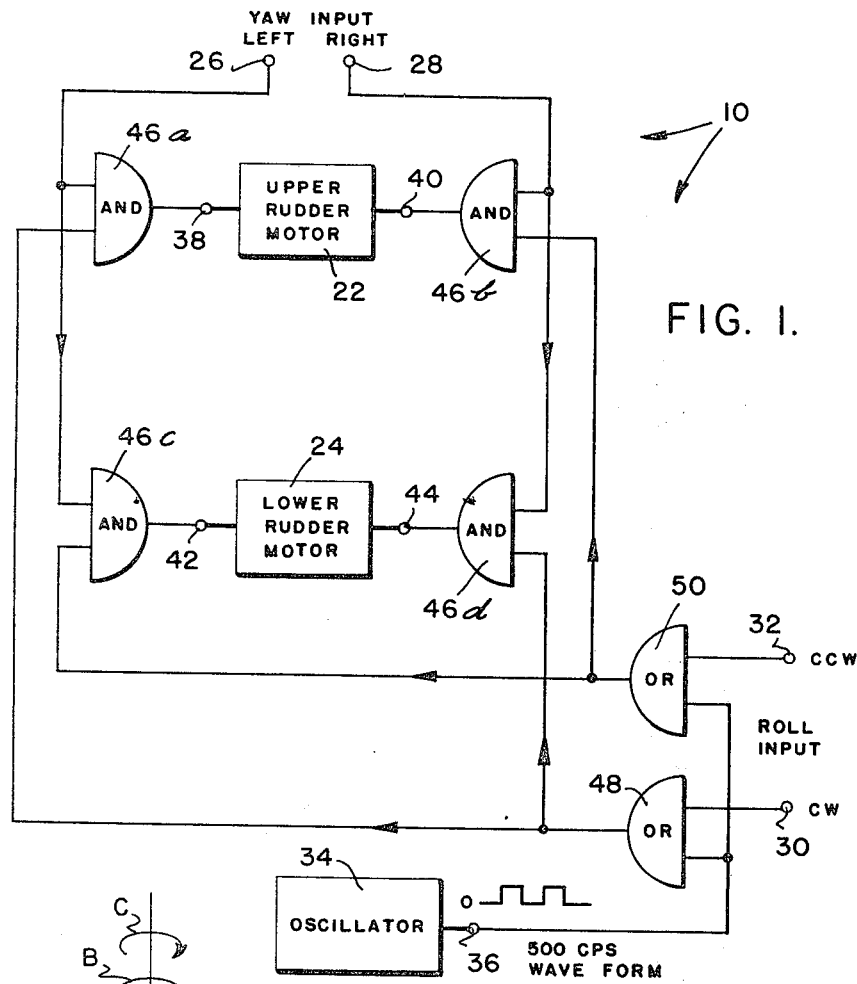
Figure 3:
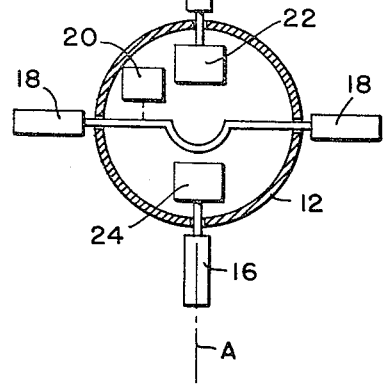
Figure 2:
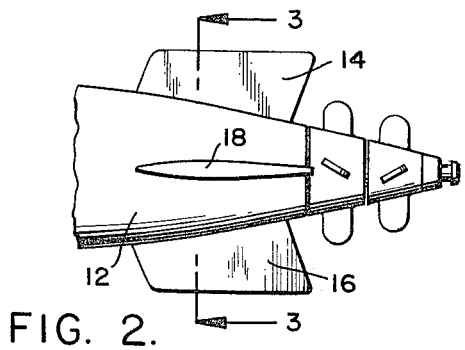

Other objects and many of the attendant advantages of this invention will be readily appreciated as the same becomes better understood by reference to the following detailed description when considered in connection with the accompanying drawings wherein:

FIG. 1 is a block diagram of an azimuth-roll control system in accordance with the present invention, and FIG. 2 is a side elevation of the tail portion of a torpedo having a cruciform control surface arrangement, and FIG. 3 is a section along line 3—3 of FIG. 2, the internal parts being shown diagrammatically.

Referring to the drawing, the subject of the invention is an azimuth-roll control system 10, FIG. 1, for a torpedo 12, FIGS. 2 and 3, having independently pivoted rudder fins 14 and 16 about a common axis A. A pair of rigidly connected diametrically opposite elevator surfaces 18 are pivotally mounted to the torpedo and are driven by a suitable steering motor 20. Upper and lower rudder motors 22 and 24, FIGS. 1 and 2, are drivingly connected to one and the other of these fins. Motors 22 and 24 are of the D.C., armature controlled permanent magnet type, such as the commercially available Globe Type LL permanent magnet motor. A worm gear or other suitable device is employed to provide the desired mechanical linkage. The inputs to the system comprise an on-off left azimuth steering signal appearing at terminal 26, a similar but right steering signal at terminal 28, an on-off clockwise roll signal appearing at terminal 30, and a similar but counter clockwise roll signal appearing at terminal 32. A multivibrator 34 generates a 500 c.p.s. square wave signal appearing at its output terminal 36.

Upper motor 22 is represented as having an input connection 38 for receiving a signal to drive fin 14 in the angular direction of arrow B, and another input connection 40 for driving fin 16 in the opposite angular direction, arrow C. It is to be understood that the representation of connections 38 and 40 as terminals is functional only, and that the connection in fact is structurally formed from logic circuitry for applying opposite polarities of voltage across the motor's control armature winding, not shown. Lower motor 18 is similarly represented as having input connections 42 and 44 for receiving signals for driving fin 14 in directions of arrows B and C respectively. Conventional AND GATES 46a, 46b, 46c and 46d, each have two inputs and an output which is connected to terminals 38, 40, 42 and 44 respectively.

The output from multivibrator 34 is applied as one of the inputs to a clockwise OR GATE 48 and to a counter clockwise OR GATE 50. The signal from clockwise signal input terminal 30 is applied as the other input to gate 48, and that from terminal 32 is applied as the other input to gate 50.

Left yaw input terminal 26 is connected to AND GATES 46a and 46c at the inputs to motors 22 and 24 for driving same in the direction of arrow B. Right yaw input terminal 28 is connected to AND GATES 46b and 46d at the motor inputs for driving in the clockwise direction. The output of OR GATE 48 is connected to AND GATES 46a and 46d, and the output of gate 50 to AND GATES 46c and 46b.

In describing the operation of system 10, it will be assumed that a left azimuth signal appears at input terminal 26 and a counter clockwise roll signal at terminal 32. Then upper motor 24 is supplied by a pulsating D.C. voltage driving upper fin 14 in the direction of arrow B at reduced speed, and the lower motor has full armature voltage so it runs in the same direction at full speed. Because a speed difference exists between the two rudders after a given interval, a differential rudder splay results, with the lower fin displaced more than the upper fin to cause the counter clockwise roll as ordered by the signal at terminal 32. If the roll command is reversed the upper motor runs in the direction of arrow C at full speed while the lower motor runs in that direction at reduced speed providing clockwise roll as ordered.

Stated another way, one of the rudder motors is run at full speed and the other at a lower speed, and the speed of the motor is controlled by the roll signal. The two speeds are obtained by switching the motor to a fixed voltage supply to run at full speed and interrupting the switch by a square wave to run at reduced speed. The characteristic of the permanent magnet D.C. motor which permits this is that magnitude of its speed is proportional to the average D.C. voltage applied to its armature. The frequency of the interrupting signal out of oscillator 34 should, of course, be much higher than the natural frequency of the motor. If desired, the roll control response can be adjusted by adjusting the duty cycle of the square wave (making it a rectangular wave) out of multivibrator 34.

Obviously many modifications and variations of the present invention are possible in the light of the above teachings. It is therefore to be understood that within the scope of the appended claims the invention may be practiced otherwise than as specifically described.

What is claimed is:

1. In an azimuth-roll control system for a torpedo including on-off control input consisting of a left yaw signal, a right yaw signal, a clockwise roll signal and a counter clockwise roll signal, the combination comprising;
    (a) upper and lower rudder surfaces separately pivoted about a common vertical axis, and upper and lower variable speed, reversible speed rudder motors geared to the upper and lower rudder surfaces, respectively,
    (b) each of said motors having a first AND GATE input for receiving a signal for driving same in a predetermined angular direction about said axis and a second AND GATE input for receiving a signal for driving same in the opposite angular direction,
(c) means for generating a regular periodic pulse signal having a pulse frequency of an order of magnitude greater than the natural frequency of the motor,
(d) first and second OR GATES, said periodic pulse signal being applied to one input of each OR GATE, said clockwise roll signal and said counter clockwise signals being applied to the other input of the first and second OR GATE, respectively,
(e) means for applying the left yaw signal to the first AND GATE input of the upper motor, and to the first AND GATE input of the lower motor,
(f) means for applying the right yaw signal to the second AND GATE input of the upper motor and to the second AND GATE of the lower motor,
(g) means for applying the output of the first OR GATE to the first AND GATE of the upper motor and to the second AND GATE of the lower motor, and
(h) means for applying the output of the second OR GATE to the second AND Gate input of the upper motor and to the first AND GATE input of the lower motor.

2. Apparatus in accordance with claim 1 wherein,
(i) said rudder motors are of the D.C. armature controlled permanent magnet type, and
(j) the repetition frequency of said periodic pulse signal is approximately 500 cycles per second.

No references cited.

BENJAMIN A. BORCHELT, *Primary Examiner.*
SAMUEL FEINBERG, *Examiner.*
P. A. SHANLEY, W. KUJAWA, *Assistant Examiners.*